J. M. RICHARDS.
BORING AND REAMING TOOL.
APPLICATION FILED SEPT. 17, 1909.
1,114,039.
Patented Oct. 20, 1914.
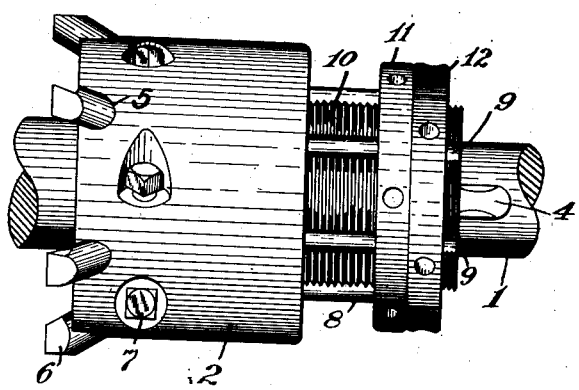
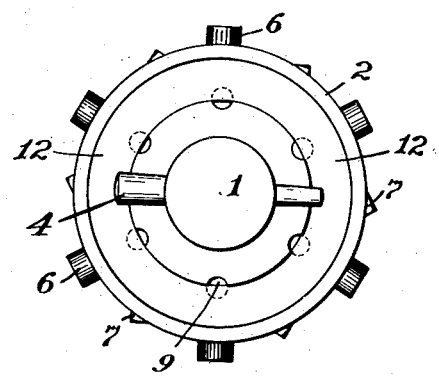
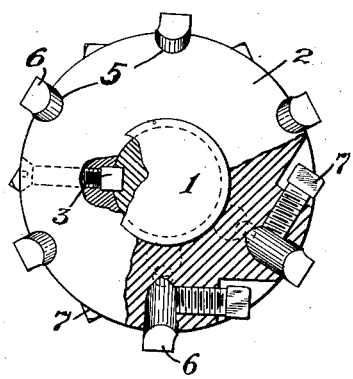
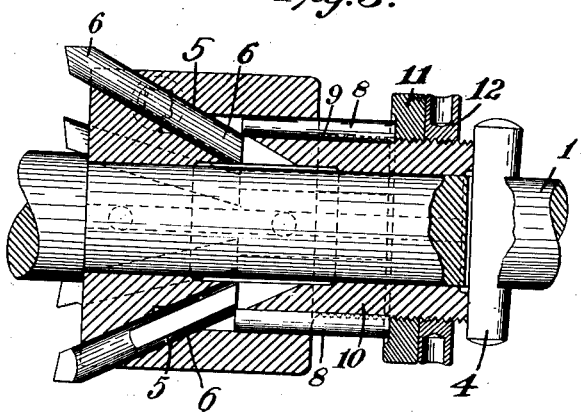
Witnesses:
Cyril C. Crick
C. A. Williams
Inventor
John M. Richards
by John H. Roney
his Att'y.

UNITED STATES PATENT OFFICE.

JOHN M. RICHARDS, OF BEAVER FALLS, PENNSYLVANIA, ASSIGNOR TO STANDARD CONNECTING ROD COMPANY, OF BEAVER FALLS, PENNSYLVANIA, A CORPORATION OF PENNSYLVANIA.

BORING AND REAMING TOOL.

1,114,039.  Specification of Letters Patent.  Patented Oct. 20, 1914.

Application filed September 17, 1909. Serial No. 518,242.

*To all whom it may concern:*

Be it known that I, JOHN M. RICHARDS, a citizen of the United States, residing at Beaver Falls, in the county of Beaver and State of Pennsylvania, have invented a new and useful Improvement in Boring and Reaming Tools, of which improvement the following is a specification.

My invention relates to improvements in boring and reaming tools and it is especially applicable in boring cylinders and such like articles.

The object of my invention is to produce an adjustable, high speed boring and reaming tool in which a plurality of cutting tools are adjustably secured in a head on a rotary shaft or mandrel, the tools being so disposed in said head that they are capable of simultaneous adjustment. I accomplish this object by means of the device hereinafter more specifically described, reference being had to the accompanying drawings, forming part hereof, in which—

Figure 1 is a side elevation of a boring and reaming tool embodying my invention; Fig. 2 is an end elevation; Fig. 3 is a longitudinal section; and Fig. 4 is an end elevation, partly in section, to show means for securing the tools in the head.

Referring to said drawings, 1 is a shaft or mandrel, capable of being rotated at high speed. 2 is a head mounted on said shaft, being secured thereto in any suitable manner, or, as shown in the accompanying drawings by means of a key 3 which is inserted in a groove or recess formed longitudinally of the shaft and the inner surface of the head for the purpose of preventing the head rotating on said shaft and the key 4 which holds said head upon said shafts and prevents the same sliding longitudinally thereon. The said head is provided, at one end, with a series of openings 5, 5 in which the cutter tools 6, 6 are seated; the said tools are preferably flattened on one side and are held firmly in said openings by means of set-screws 7, 7, which engage against said flattened sides. The said openings diverge from the axis of said head outward through the peripheral edge thereof, so as to enable the tools seated therein to describe a larger circle at their outer ends than at the inner ends thereof, the said tools being capable of adjustment in said openings or holders and of being held there when adjusted by means of said set screws. The adjustment of said tools simultaneously is accomplished by means of a number of rods 8, 8 seated in slots 9, 9 formed longitudinally on the outer surface of the extension 10 of said head. The outer surface of said extension is provided with a screw-thread, and has mounted thereon the nut 11 and the lock nut 12, the inner side of nut 11 contacting with the inner ends of the several rods to move the same inwardly against the inner ends of the several cutting tools for the purpose of moving the same outwardly any required distance in the adjustment thereof, the said tools being adapted to be held when so adjusted by the set screws as heretofore set forth.

Having described my invention, what I claim and desire to secure by Letters Patent is—

1. In a device of the character described, the combination of a spindle, a head having a bore in which said spindle is fixed and adapted to rotate therewith, the forward end of said head being of greater diameter than the rear end thereof and having a number of openings inclined from the outer periphery to the bore thereof, and a corresponding number of horizontally disposed openings extending from the rear of said head and intersecting said inclined openings, cutter tools secured in said inclined openings and rods adapted to be seated in said horizontal openings and to engage the rear ends of the cutters, and means to advance and lock said rods against the rear ends of said cutters.

2. In a device of the character described, the combination of a rotatable shaft, a cylindrical head rigidly secured thereon, the said head having an extension of less diameter than the major part thereof, the said head having a plurality of openings divergently disposed therein, the rear end of said head on a line with the extension thereof, having a plurality of openings therein, cutting tools seated in the divergent openings in the front portion of the head, adjusting rods seated in the openings in the rear portion of the head, and adapted to engage against the rear ends of the cutting tools and an adjusting nut mounted on the extension of the head adapted to engage against the adjusting rods for the purpose of moving the same toward the rear ends of the cutting tools.

In testimony whereof, I have hereunto signed my name in the presence of two subscribing witnesses.

JOHN M. RICHARDS.

In the presence of—
H. F. HAWKINS,
JOHN GILLEN.